(12) United States Patent
Dinh

(10) Patent No.: US 10,427,539 B2
(45) Date of Patent: Oct. 1, 2019

(54) CONNECTOR ASSEMBLY

(71) Applicant: Faraday&Future Inc., Gardena, CA (US)

(72) Inventor: Khiem Dinh, Hawthorne, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/198,251

(22) Filed: Jun. 30, 2016

(65) Prior Publication Data

US 2018/0003324 A1    Jan. 4, 2018

(51) Int. Cl.
*F16L 37/34*    (2006.01)
*B60L 11/18*    (2006.01)
*B60L 58/26*    (2019.01)

(52) U.S. Cl.
CPC ........... *B60L 11/1874* (2013.01); *B60L 58/26* (2019.02); *F16L 37/34* (2013.01); *Y10T 137/87949* (2015.04)

(58) Field of Classification Search
CPC . F16L 37/34; F16L 37/30; F16L 37/32; Y10T 137/87949; Y10T 137/87957
USPC ........................................ 137/614.03, 614.04
See application file for complete search history.

(56) References Cited

U.S. PATENT DOCUMENTS

| | | | | |
|---|---|---|---|---|
| 2,962,303 A * | 11/1960 | Ramberg et al. | ....... | F16L 37/23 137/614 |
| 3,201,151 A * | 8/1965 | Westveer | .................. | F16B 1/00 137/614.04 |
| 3,211,178 A * | 10/1965 | Kiszko | ................ | F16L 27/0824 137/614.04 |
| 4,429,713 A * | 2/1984 | Walter | ..................... | F16L 37/23 137/614.03 |
| 6,179,001 B1 * | 1/2001 | Schutz | .................. | F16L 37/565 137/614.01 |
| 6,626,207 B1 * | 9/2003 | Smith, III | ............... | F16L 37/32 137/614.03 |
| 7,942,163 B2 * | 5/2011 | Sauer | ..................... | F16L 29/007 137/614.03 |
| 2013/0186495 A1 * | 7/2013 | Abura et al. | ............ | F16L 37/28 137/798 |
| 2014/0175314 A1 * | 6/2014 | Bondo et al. | .......... | A61M 39/26 251/149.6 |
| 2015/0377402 A1 * | 12/2015 | Boothe et al. | ....... | F16L 55/1015 251/149.7 |
| 2016/0061370 A1 * | 3/2016 | Gennasio et al. | ....... | F16L 37/34 251/58 |

* cited by examiner

*Primary Examiner* — Kevin L Lee
(74) *Attorney, Agent, or Firm* — Veros Legal Solutions, LLP

(57) ABSTRACT

Systems and methods are described relating a connector assembly having a mating end and a non-mating end, the mating end configured to engage a mating end of another connector assembly. The connector assembly may include a housing, a central member disposed within the housing, and a sleeve disposed between the central member and the housing. The sleeve may be slidably coupled to the housing and may be slidable along an axial direction relative to the central member. The sleeve, when slidably moved to an open position, may form a flow channel defined by at least (1) a sloped surface on the sleeve and (2) a sloped surface on the central member. The sleeve, when slidably moved to a closed position, may close the flow channel.

10 Claims, 10 Drawing Sheets

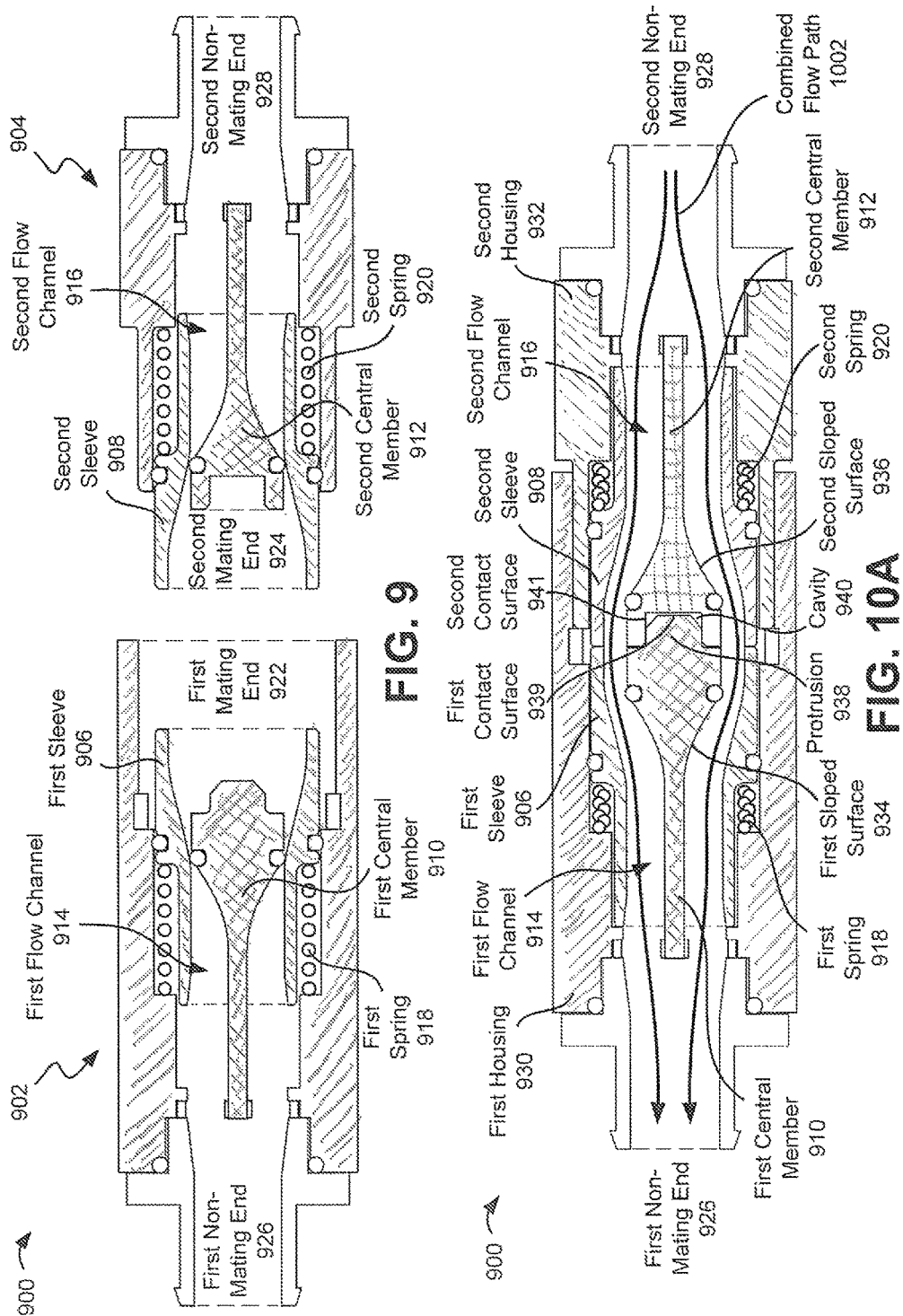

CONNECTOR ASSEMBLY

BACKGROUND

Modern machines such as cars, trucks, vans, airplanes, boats, and the like, use fluids during operation. Some fluids, such as gasoline, diesel, and ethanol, are consumed by modern machines for propulsion. Other fluids, such as lubricants and coolants, are circulated for protecting internal components.

Fluids for modern machines may flow by way of flow paths formed by a series of tubes and connectors. Generally, a connector system includes connector devices that can connect together to form a flow path between two fluid reservoirs, and disconnect from one another to separate a flow path between two fluid reservoirs. Disconnecting the connector devices when a flow path exists between the two fluid reservoirs may cause fluid to uncontrollably drain from both fluid reservoirs. As a result, valved connectors have been developed to prevent fluid from flowing out of the reservoirs when the flow path is disconnected, by sealing respective openings on each side of the separated flow path. Valved connectors as discussed in the present disclosure generally refer to connectors that have the ability to cut off the flow of fluids upon disconnection. Some valved connectors are also known as dry break connectors, which refer to valved connectors that prevent residual spillage upon disconnection and the cut off of fluid flow. Other valved connectors, i.e., those that are not strictly "dry" connectors, may leave some residual fluid, such as small amounts of fluid left in pockets or recesses, that can spill from the system after disconnection and the cut off of fluid flow. While the term "reservoir" is used herein to describe both sides of a connection system (e.g., "between the two reservoirs"), the direction of fluid flow may only be in one direction and not in both directions. One reservoir may be flowing to the other in one direction through the connector system. A "reservoir" thus is a potential source of fluid and does not necessarily connote a particular direction of fluid flow. The structural design of current valved connectors creates impedances within flow paths through the connectors, thereby causing inefficient fluid flow. Accordingly, there is a need for improved design of valved connectors.

SUMMARY

Embodiments provide apparatuses and systems for improved valved connectors that have smooth and efficient flow paths. An exemplary valved connector includes a central member having a smooth conical surface as part of a flow channel along which fluid may flow within the valved connector. Structures that may impede the flow of fluids through the flow channel, such as springs or other structural impedances, may be removed from the flow channel, thereby minimizing flow impedance and turbulence and providing a smooth and efficient flow path.

In some embodiments, a connector assembly may include a mating end and a non-mating end, the mating end configured to engage a mating end of another connector assembly. The connector assembly may include a housing, a central member disposed within the housing, and a sleeve disposed between the central member and the housing. The sleeve may be slidably coupled to the housing and slidable along an axial direction relative to the central member. When slidably moved to an open position, the sleeve may form a flow channel defined by at least (1) a sloped surface on the sleeve and (2) a sloped surface on the central member. When slidably moved to a closed position, the sleeve may close the flow channel.

The sloped surface on the sleeve may be part of a conical surface on the sleeve, and the sloped surface on the central member may be a part of a conical surface on the central member. The conical surface may have a narrow end toward the non-mating end of the connector assembly and a wide end toward the mating end of the connector assembly. At the mating end of the connector assembly, the sleeve may extend past the housing along the axial direction. The housing may extend past the entire sleeve along the axial direction toward the mating end of the connector assembly. In certain embodiments, the connector assembly may further include a spring coupled to the sleeve and configured to apply a force to move the sleeve toward the closed position. The spring may be positioned out of a direct path of fluid flow through the flow channel. The spring may be compressed when the sleeve is in the open position and decompressed when the sleeve is in the closed position. The central member may include a contact surface, and the contact surface may define a recess at the mating end of the connector assembly. The central member may include a contact surface, and the contact surface may define a protrusion at the mating end of the connector assembly. The protrusion may be configured to insert into a recess defined by a contact surface of a central member of another connector assembly.

In some embodiments, a connector system may include a first connector assembly having a first mating end and a first non-mating end. The first connector assembly may include a first housing, a first central member disposed within the first housing, and a first sleeve disposed between the first central member and the first housing. The first sleeve may be slidably coupled to the first housing and may be slidable along an axial direction relative to the first central member. The connector system may also include a second connector assembly having a second mating end and a second non-mating end. The second mating end may be configured to engage the first mating end. The second connector assembly may include a second housing, a second central member disposed within the second housing, and a second sleeve disposed between the second central member and the second housing. The second sleeve may be slidably coupled to the second housing and may be slidable along the axial direction. When the connector system is in a connected state, the first connector assembly may be coupled to the second connector assembly, which forms a flow channel defined by at least (1) a first sloped surface on the first sleeve, (2) a first sloped surface on the first central member, (3) a second sloped surface on the second sleeve, and (4) a second sloped surface on the second central member. When the connector system is in a disconnected state, the first connector assembly may be separated from the second connector assembly. In the disconnected state, the first and second sleeves may close the first and second flow channels, respectively.

The first sloped surface on the first sleeve may be part of a conical surface on the first sleeve. The first sloped surface on the first central member may be a part of a conical surface on the first central member. The second sloped surface on the second sleeve may be part of a conical surface on the second sleeve. The second sloped surface on the second central member may be a part of a conical surface on the second central member. The conical surface of the first central member may have a narrow end toward the first non-mating end of the first connector assembly, as well as a wide end toward the first mating end of the first connector assembly.

The conical surface of the second central member may have a narrow end toward the second non-mating end of the second connector assembly, as well as a wide end toward the second mating end of the second connector assembly. Thus, the mating ends of the first and second connector assemblies may face one another. The first sloped surface and the second sloped surface may be asymmetrical and form a tear drop shape.

In some embodiments, a method of connecting a first connector assembly with a second connector assembly may include a step of orienting a first mating end of the first connector assembly toward a second mating end of the second connector assembly. The method may also include a step of applying a first pressure against the first connector assembly and the second connector assembly toward one another. The method may further include a step of contacting a first sleeve of the first connector assembly with a second sleeve of the second connector assembly. The first pressure may be greater than a second pressure applied by a first spring against the first sleeve and a second spring against the second sleeve. In addition, the method may include a step of coupling a first housing of the first connector assembly with a second housing of the second connector assembly. Thus, a flow channel may be formed that extends across the entire connector system.

Coupling the first housing with the second housing may be performed by further applying the first pressure against the first connector assembly and the second connector assembly to insert the second connector assembly into the first connector assembly. Coupling the first housing with the second housing may move the first sleeve and the second sleeve from a closed position to an open position. In the closed position, the first sleeve may contact a first central member of the first connector assembly, and the second sleeve may contact a second central member of the second connector assembly. In the open position, the first sleeve may be separated from a first central member, and the second sleeve may be separated from a second central member. In certain embodiments, the flow channel may surround the first central member and the second central member.

A better understanding of the nature and advantages of some embodiments of the present disclosure may be gained with reference to the following detailed description and the accompanying drawings.

BRIEF DESCRIPTION OF THE DRAWINGS

FIG. 9 is a cross-sectional diagram illustrating a connector system in a disconnected state, according to embodiments of the present disclosure.

FIG. 10A is a cross-sectional diagram illustrating a symmetrical valved connector system in a connected state, according to embodiments of the present disclosure.

DETAILED DESCRIPTION

An exemplary valved connector assembly includes a central member and a housing. A sleeve is positioned between the central member and the housing and configured to slide in an axial direction to close a flow channel by pinching the sleeve against the central member when the sleeve is in a closed position (e.g., when the valved connectors are disconnected such that a flow path between two fluid reservoirs is separated). The flow channel may open by sliding the sleeve away from a surface of the central member when the sleeve is in an open position (e.g., when the valved connectors are connected to form a flow path between the two fluid reservoirs). The flow channel may be defined by a surface of the central member and a surface of the sleeve such that the flow channel surrounds a radial surface of the central member. The central member may include a smooth conical surface that tapers away from a mating end of the connector assembly, thereby providing a smooth surface along which fluid may flow in the flow channel. The smooth conical surface minimizes flow impedance and turbulence of fluid flow, thus providing a consistent and efficient flow path.

Figure 1:
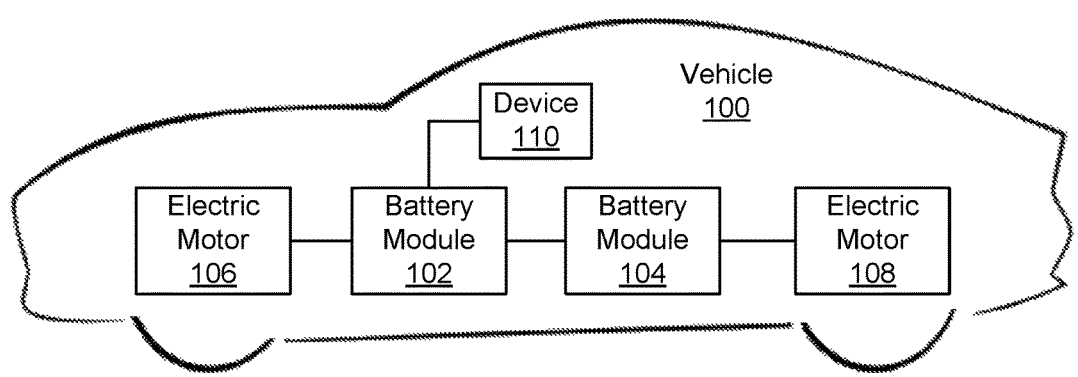
FIG. 1 illustrates an exemplary electric vehicle, according to embodiments of the present disclosure.

Valved connectors discussed herein may be implemented in any machine that uses fluid during operation and employs a connector. For example, valved connectors may be implemented in electric vehicles that use coolant fluid to cool battery modules. FIG. 1 illustrates an exemplary electric vehicle 100 according to embodiments of the present disclosure. Vehicle 100 may include several battery modules 102 and 104 configured to dissipate stored charge to power electric motors 106 and 108 for propelling vehicle 100 and/or to power an electronic device 110 such as an infotainment system, control panel, climate control system, and the like. As is generally known, batteries depend for their operation on an electrochemical process. The operation of a battery usually generates heat due to power losses as current flows through the internal resistance of the battery, which is known as Joule heating. To counteract the effects of Joule heating, a cooling system may be implemented to cool the battery modules during discharging and/or charging. The cooling system may flow a cooling fluid over battery cells of battery modules 102 and 104 to reduce the effects of Joule heating, as will be discussed further herein.

Although embodiments are discussed with respect to electric vehicles, one skilled in the art would understand that valved connectors may be implemented in any machine where fluid is used. For example, valved connectors discussed herein may be implemented in gas-powered vehicles. A gas-powered vehicle may have a valved connector at the end of a fuel line for its fuel tank that is configured to mate with a complementary valved connector at the end of a fuel source so that, when connected, allow fuel to flow from the fuel source to the fuel tank, and, when disconnected, prevent fuel from uncontrollably flowing out of the fuel tank and the fuel source. It should therefore be appreciated that applications of valved connectors discussed herein are not strictly limited to electric vehicles. Additionally, although FIG. 1 illustrates only two battery modules, it is to be appreciated that embodiments are not intended to be limited to two battery modules, and that other embodiments may have more or fewer battery modules in a vehicle.

I. Cooling System

Figure 2:
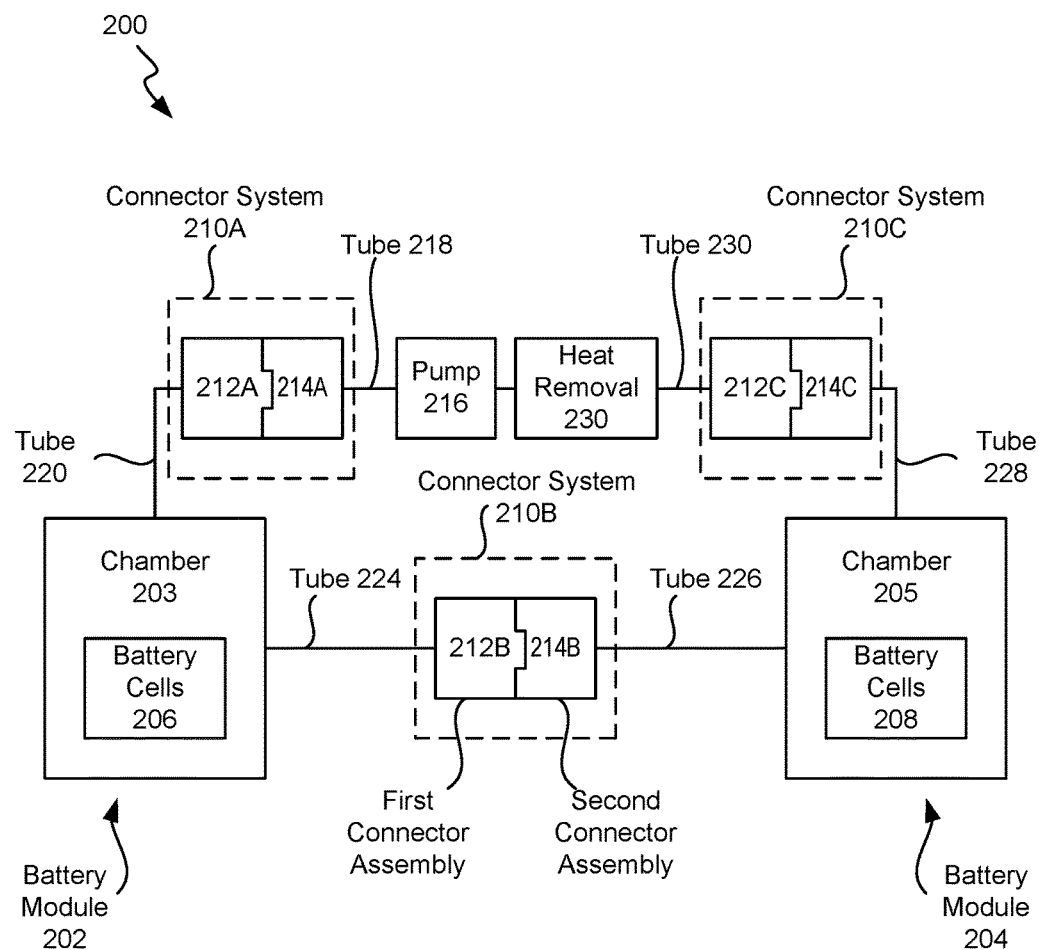
FIG. 2 is a block diagram illustrating an exemplary cooling system for an electric vehicle, according to embodiments of the present disclosure.

As mentioned above, a cooling system may be implemented in an electric vehicle to counteract rises in temperature caused by Joule heating. FIG. 2 is a block diagram illustrating an exemplary cooling system 200 for an electric vehicle, such as vehicle 100 in FIG. 1. Cooling system 200 may include a pump 216 for pumping coolant fluid to battery modules 202 and 204. Each battery module 202 and 204 may include a chamber 203 and 205 for housing battery cells 206 and 208, respectively. Battery cells 206 and 208 may store charge for powering individual components of the electric vehicle, such as one or more electric motors and electronic devices.

In some embodiments, pump 216 pumps coolant fluid to battery modules 202 and 204 in a closed loop flow path. For instance, pump 216 may pump coolant fluid in a counterclockwise direction, e.g., to battery module 202 through tubes 218 and 220 and connector system 210A, then to battery module 204 through tubes 224 and 226 and connector system 210B, and then back to pump 216 through a heat removal component 230, tubes 228 and 230, and connector system 210C, or in a clockwise direction through a reverse component order. Heat removal component 230 may remove heat from the coolant fluid flowing through cooling system 200 such that coolant fluid flowing through chambers 203 and 205 may remain cold enough to cool battery cells 206 and 208. When reaching battery module 202, coolant fluid may flow into chamber 203 and flow around battery cells 206 to cool battery cells 206 before flowing to chamber 205 to cool battery cells 208. After passing over battery cells 208, coolant fluid may flow back to pump 216, which may recirculate coolant fluid back to chamber 203.

Here, valved connector systems are used to facilitate easy connection and disconnection of battery modules 202 and 204. As shown, connector system 210A may be positioned along a flow path between pump 216 and battery module 202. Connector system 210B may be positioned along a flow path between battery module 202 and battery module 204. Connector system 210C may be positioned along a flow path between battery module 204 and pump 216. Each connector system 210A, 210B, and 210C may include a first connector assembly 212A, 212B, or 212C, respectively, and a second connector assembly 214A, 214B, or 214C, respectively. First and second connector assemblies 212A and 214A may be configured to enable coolant fluid to flow across connector system 210A when connected, and prevent coolant fluid from flowing across connector system 210A when disconnected. Connector systems 210 B and 210C operate in a similar fashion. Connector systems 210A-210C allow individual battery modules to be added or removed for various purposes, such as installation, troubleshooting, maintenance, and/or replacement. As an example, connector systems 210A and 210B may be disconnected so that battery module 202 may be removed from cooling system 200.

In certain embodiments, connector systems 210A-210C may be valved connector systems according to embodiments of the present disclosure. In such embodiments, when first and second connector assemblies 212A-212C and 214A-214C are disconnected, respective tubes may be sealed such that coolant fluid does not uncontrollably flow out of the fluid reservoirs to which they are attached. Using valved connectors is beneficial in that coolant fluid does not have to be drained from cooling system 200 when performing maintenance on a battery module. Likewise, cooling system 200 does not need to be filled back up with coolant fluid after performing maintenance on a battery module. Nor does a technician need to find a place to temporarily store the drained coolant fluid while performing maintenance on the disconnected battery module. Thus, maintenance is significantly easier to perform, and costs associated with performing such maintenance is substantially decreased.

II. Connector Assembly

Using valved connector systems may increase flow resistance through cooling system 200. The internal structural configuration of each connector system 210 may create fluid turbulence that impedes the smooth flow of fluid from one reservoir to the other. Higher impedances require a stronger pump 216 to overcome the impedance to continue fluid flow through cooling system 200. Stronger pumps 216 use more power, dissipate more heat, are more expensive, and may negatively impact the range of an electric vehicle. Thus, reducing the amount of fluid impedance across each connector system 210A-210C may allow cooling system 200 to be implemented with a weaker pump that uses less power, is cooler to run, is less expensive, and may positively impact the range of an electric vehicle. Embodiments herein disclose improved valved connector assemblies that have low flow impedances.

According to some embodiments, first connector assemblies 212A-212C may be configured to mate with respective second connector assemblies 214A-214C when connector system 210A-210C is connected to allow fluid flow. First connector assemblies 212A-212C may be male connector assemblies that couple with second connector assemblies 214A-214C configured as female connector assemblies, or vice versa.

A. Male Connector Assembly

Figure 3:
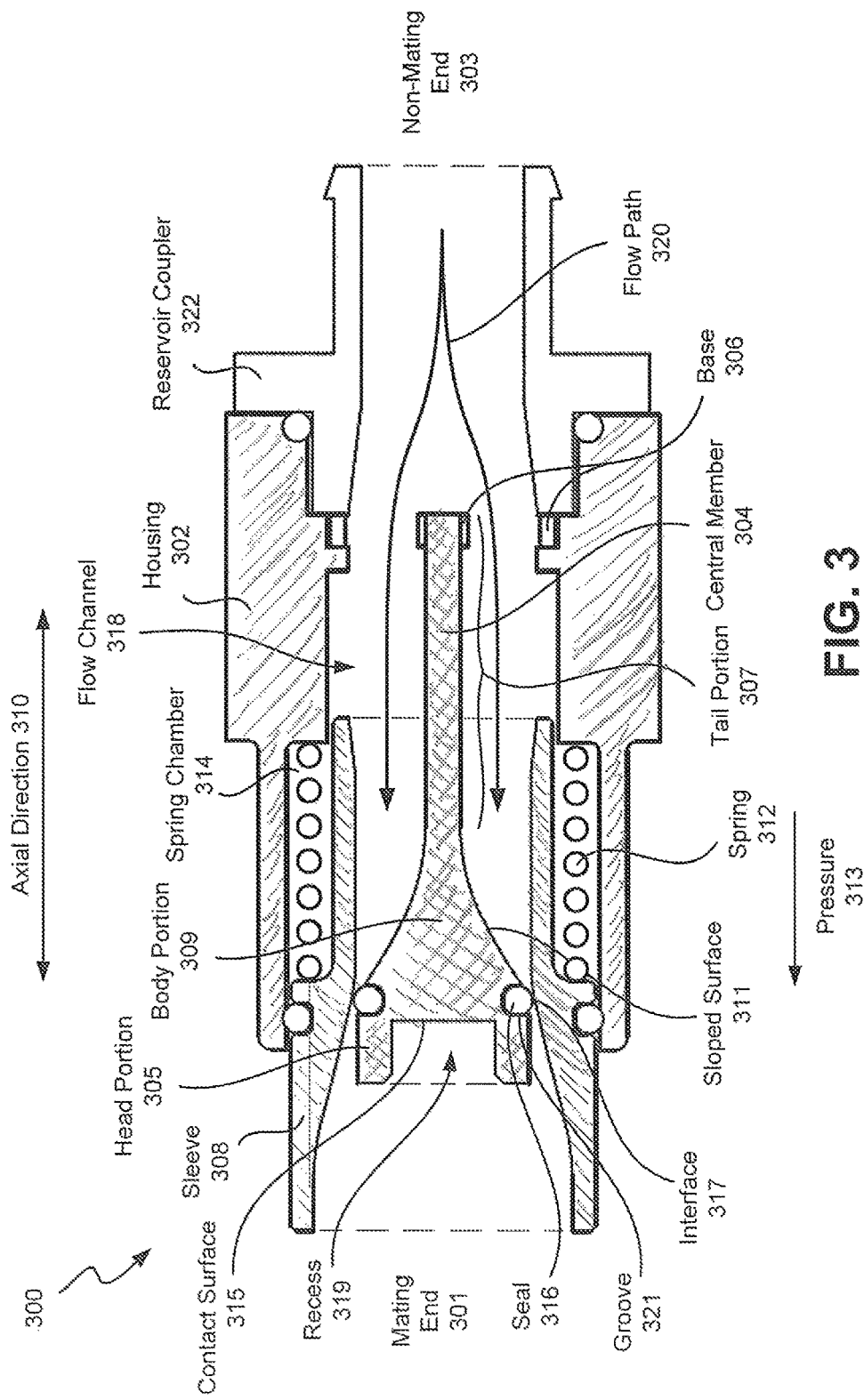
FIG. 3 is a cross-sectional diagram illustrating an exemplary male valved connector assembly having a sleeve in a closed position, according to embodiments of the present disclosure.

FIG. 3 is a cross-sectional diagram illustrating an exemplary male valved connector assembly 300, according to embodiments of the present disclosure. Connector assembly 300 includes a mating end 301 and a non-mating end 303 opposite of mating end 301. Mating end 301 of connector assembly 300 may be configured to couple with a female valved connector assembly, as will be discussed further herein. Connector assembly 300 includes a housing 302 and a central member 304. Housing 302 may be attached to a reservoir coupler 322 that is configured to couple with a reservoir for providing and receiving fluid through connector assembly 300. In some embodiments, reservoir coupler 322 may be a separate structure that is attached to housing 302, or may be a part of housing 302.

Central member 304 may be a single, unitary structure that includes a head portion 305, a tail portion 307, and a body portion 309 between head portion 305 and tail portion 307. Head portion 305 may have a cross-sectional diameter that is greater than a cross-sectional diameter of tail portion 307. In some embodiments, head portion 305 includes a contact surface 315 defining a recess 319 within which a central member of a female connector may insert and make contact with contact surface 315, as will be discussed further herein. In some embodiments, contact surface 315 may not define a recess 319, but instead define a flat, vertical surface that may make contact with a corresponding flat, vertical surface. Tail portion 307 may include a base 306 fixed against housing 302 such that central member 304 does not move relative to housing 302. Base 306 can be a part of tail portion 307 such that base 306 is part of the single, unitary structure of central member 304, or base 306 can be a separate structure that is fixed to central member 304. Although base 306 may fix central member 304 to housing 302, embodiments are not so limited. In some embodiments, head portion 305 may be fixed to housing 302, and/or body portion 309 may be fixed to housing 302. It is to be appreciated that any suitable method of attaching central member 304 to housing 302 is envisioned in certain embodiments herein. In particular embodiments, central member 304 is oriented within housing 302 such that tail portion 307 faces non-mating end 303 and head portion 305 faces mating end 301. Arranging central member 304 in this orientation provides for low fluid impedance across male connector assembly 300, as will be discussed in more detail further herein.

According to embodiments of the present disclosure, body portion 309 may have a sloped surface 311 that creates a conical shape that is wider near head portion 305 and narrower near tail portion 307. Sloped surface 311 is a smooth surface that gradually transitions from head portion 305 to tail portion 307. In some embodiments, the transition of sloped surface 311 across body portion 309 is continuous such that the slope does not change sign across the entire sloped surface 311 when traveling along the axial direction 310. For instance, in the cross-sectional view of FIG. 3, the tangent of every point along bottom sloped surface 311 (on the underside of central member 304, traveling along the axial direction 310) may have a negative slope. That is, the slope may not change sign from negative to positive along this path. In certain embodiments, sloped surface 311 can have any suitable slope profile. As an example, slope surface 311 can have a linear or an exponential slope profile.

Connector assembly 300 may also include a sleeve 308, which may be positioned between central member 304 and housing 302. In some embodiments, sleeve 308 can be slidably coupled to housing 302. Being slidably coupled to housing 302 means that sleeve 308 is coupled to housing 302 in a way that allows sleeve 308 to slide along a certain direction relative to housing 302 (as well as central member 304 given that central member 304 is fixed to housing 302). For instance, sleeve 308 may be slidably coupled to housing 302 such that it is allowed to move along an axial direction 310 relative to housing 302 and central member 304. In some embodiments, a spring 312 rests within a spring chamber 314 formed by vacant space between sleeve 308 and housing 302. Spring 312 may be coupled to sleeve 308 and configured to apply pressure 313 against sleeve 308 toward mating end 301 of connector assembly 300. In certain embodiments, spring 312 is positioned out of the flow path of the fluid, preventing the presence of the spring from creating fluid turbulence and impedance along the flow path. A thickest portion of sleeve 308 may prevent sleeve 308 from being pushed out of housing 302 by wedging against both central member 304 and housing 302. In some embodiments, a seal 316 may be positioned on central member 304 to form a non-permeable barrier at an interface 317 to prevent fluid from flowing between central member 304 and sleeve 308 when sleeve 308 is pressed against central member 304. Seal 316 may be an o-ring, or any other suitable seal for preventing fluid flow. In some embodiments, seal 316 may be positioned within a groove 321 in head portion 305 or between head portion 305 and body portion 309. Groove 321, however, may not create fluid turbulence because when seal 316 is positioned in groove 321, the outer curvature of seal 316 may continue the smooth surface of head portion 305 and/or body portion 309. Although seal 316 is positioned on central member 304, some embodiments may be configured to have seal 316 positioned on sleeve 308. Seal 316 may be positioned on sleeve 308 such that a non-permeable barrier may be formed at interface 317 to prevent fluid flow when sleeve 308 is pressed against central member 304.

In particular embodiments, when sleeve 308 is wedged between central member 304 and housing 302, sleeve 308 is in a closed position, meaning fluid is prevented from flowing across an entire flow channel 318, as shown in FIG. 3. Flow channel 318 may be a length of vacant space formed by surfaces of sleeve 308, central member 304, and housing 302 through which fluid may flow between mating end 301 and non-mating end 303 of connector assembly 300. A flow path 320 illustrates one possible direction of fluid flow through flow channel 318. Fluid may flow into connector assembly from non-mating end 303 toward mating end 301. Given that connector assembly 300 shown in FIG. 3 is in a closed position, flow channel 318 is closed, thereby preventing flow path 320 from extending all the way to mating end 301 past interface 317. As a result, fluid flowing into connector assembly 300 from non-mating end 303 is sealed within connector assembly 300 and prevented from flowing out of connector assembly 300. In some embodiments, when sleeve 308 is in the closed position, sleeve 308 extends past housing 302 along axial direction 310 toward mating end 301 of connector assembly 300.

As mentioned herein, pressure 313 applied by spring 312 moves sleeve 308 into the closed position where sleeve 308 is wedged between central member 304 and housing 302. When pressure 313 is overcome by a greater pressure in an opposing direction, then sleeve 308 may slide into an open position, as shown in FIG. 4.

Figure 4:
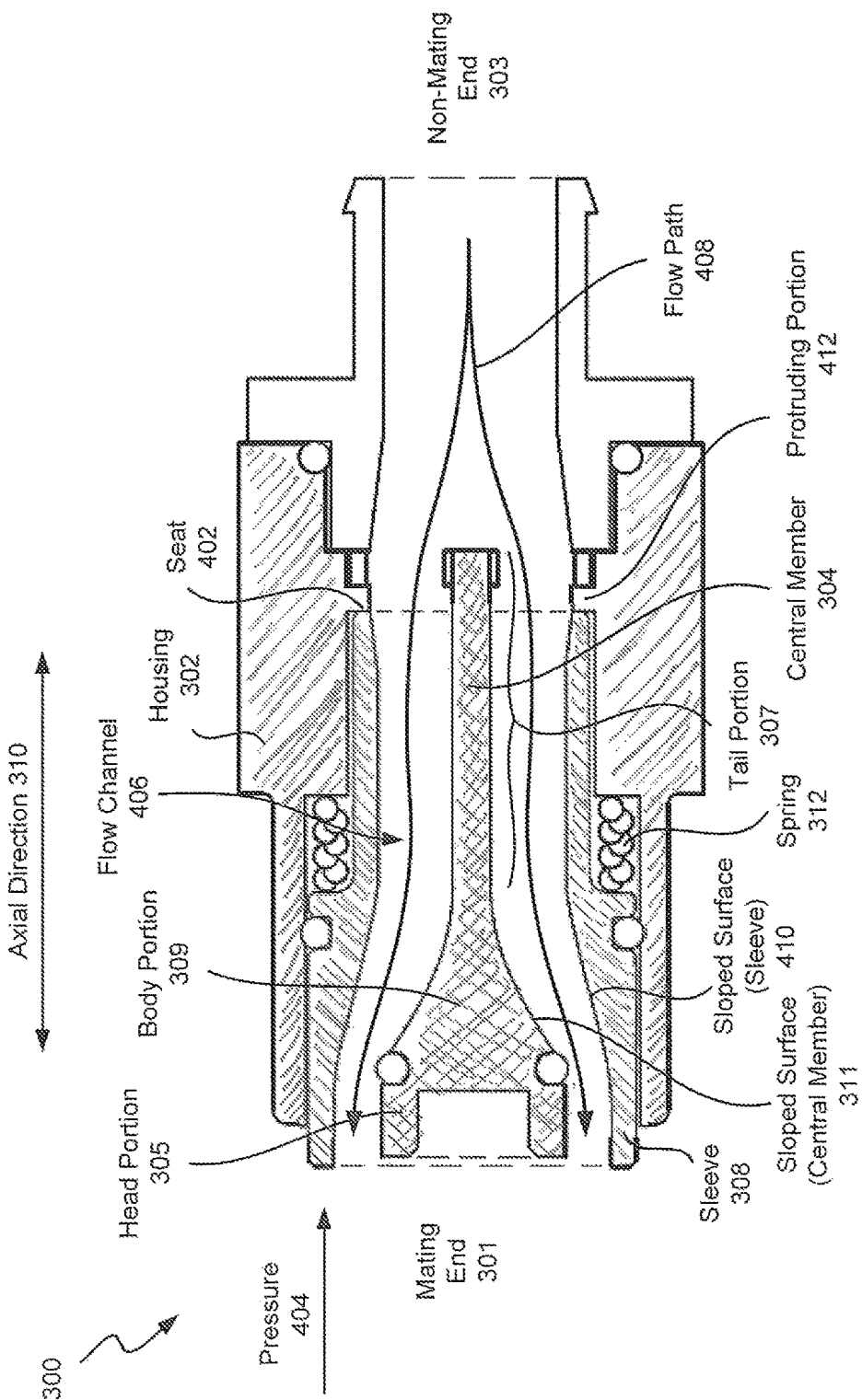
FIG. 4 is a cross-sectional diagram illustrating an exemplary male valved connector assembly having a sleeve in an open position, according to embodiments of the present disclosure.

FIG. 4 is a cross-sectional diagram illustrating male valved connector assembly 300 when sleeve 308 is in the open position. Pressure 404 that is greater than pressure 313 in FIG. 3 causes spring 312 to compress and sleeve 308 to move along axial direction 310 toward non-mating end 303 until it contacts a seat 402. In some embodiments, seat 402 may be a protruding portion 412 of housing 302 that protrudes toward central member 304 to stop further movement of sleeve 308. In the open position, sleeve 308 no longer contacts central member 304 so that a flow channel 406 may extend across the entire connector assembly 300 between mating end 301 and non-mating end 303. In certain embodiments, flow channel 406 may be a vacant space defined by sleeve 308 and central member 304. In some embodiments, when spring 312 is compressed and flow channel 406 extends across the entire connector assembly 300, sleeve 308 may not contact seat 402. A gap may be positioned between sleeve 308 and seat 402 to allow for actuation of a locking feature (not shown) on housing 302, such as a bayonet style locking feature. In such embodiments, sleeve 308 may be positioned a distance of between 0.25 to 0.75 mm, such as 0.5 mm, away from seat 402.

According to embodiments of the present disclosure, sleeve 308 may include a sloped surface 410 that complements sloped surface 311 of central member 304. Similar to sloped surface 311, sloped surface 410 may be smooth and continuous such that fluid is not impeded when flowing across sloped surface 410. The complementary sloped surfaces 410 and 311 form a portion of flow channel 406 that has minimal flow impedances. Thus, when sleeve 308 in the open position, fluids may flow along a flow path 408 through flow channel 406 from non-mating end 303 to mating end 301 without encountering substantial flow impedances from central member 304 and sleeve 308. Furthermore, spring 312 is positioned outside of flow channel 406, and isolated from flow channel 406 by sleeve 308 so that it is not directly in flow path 408. Accordingly, spring 312 does not create turbulence in fluid flowing through flow channel 406, thereby improving flow efficiency of connector assembly 300. As shown in FIG. 4, flow channel 406 may surround the outer radial surface of central member 304 and allow flow path 408 to flow along the outer radial surface of central member 304.

Figure 5:
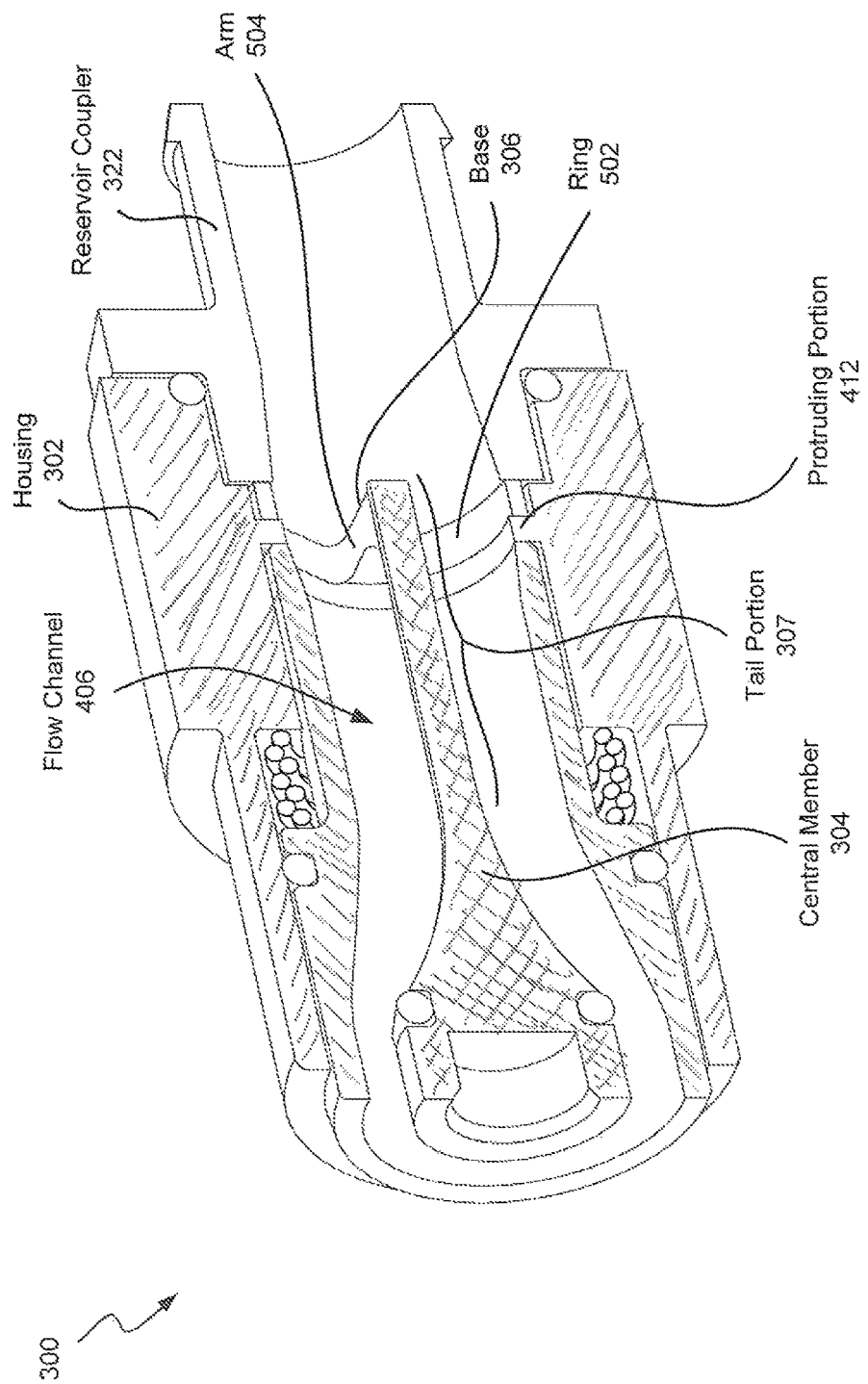
FIG. 5 is a cut-away diagram illustrating a perspective view of an exemplary male valved connector assembly having a sleeve in an open closed position, according to embodiments of the present disclosure.

FIG. 5 is a cut-away diagram illustrating a perspective cross-sectional view of connector assembly 300 for a better understanding of its three-dimensional structure. In some embodiments, connector assembly 300 may have a cylindrical three-dimensional shape where the cross-section across its central axis has a substantially circular profile. It is to be appreciated that other embodiments are not limited to cross-sections with substantially circular profiles. Rather, cross-sectional profiles of any shape without departing from the spirit and scope of the present disclosure, such as, but not limited to, rectangular and ovular cross-sectional profiles are envisioned in some embodiments herein.

As shown in FIG. 5, the structure of base 306 may be configured to fix central member 304 to housing 302 without substantially impeding fluid flow through flow channel 406. In some embodiments, base 306 includes a ring 502 and one or more arms 504 coupling tail portion 307 of central member 304 to ring 502 for securing central member 304 to housing 302. Base 306 may be fixed to housing 302 by confining base 306 between protruding portion 412 of housing 302 and reservoir coupler 322 in a way that prevents central member 304 from moving relative to housing 302. A better perspective of the entire structure of central member 304 is shown in FIG. 6.

Figure 6:
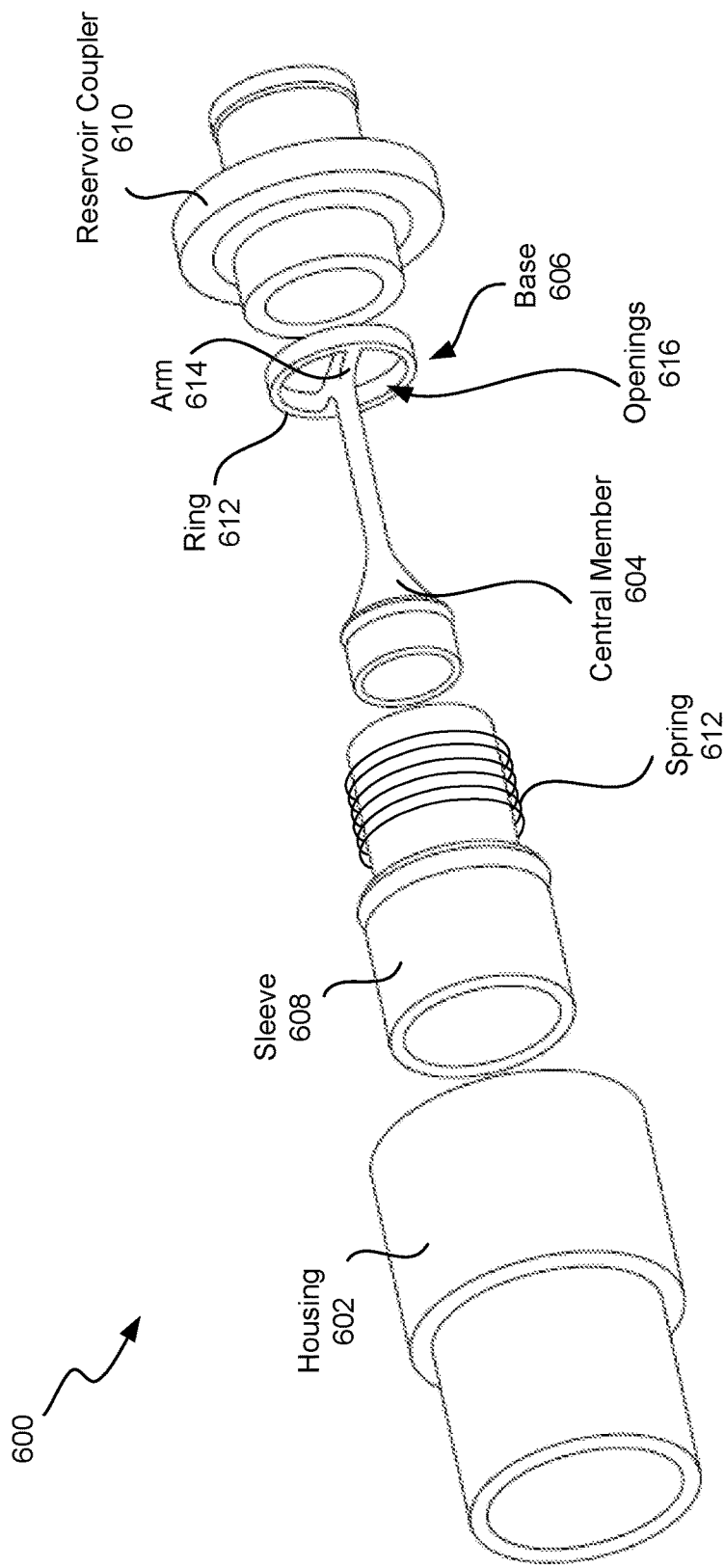
FIG. 6 is a simplified diagram illustrating an exploded view of an exemplary male valved connector assembly, according to embodiments of the present disclosure.

FIG. 6 is a simplified diagram illustrating an exploded view of an exemplary connector assembly 600, such as male valved connector assembly 300 discussed herein with respect to FIGS. 3-5, according to embodiments of the present disclosure. The exploded view separates the various components of connector assembly 600 so that each component can be individually observed.

As shown in FIG. 6, housing 602 may be a cylindrical structure configured to house sleeve 608 and central member 604. A spring 612 may wrap around a portion of sleeve 608 and be configured to apply pressure against sleeve 608 as discussed herein with respect to spring 312 and sleeve 308 in FIG. 3. Central member 604 may be fixed to housing 602 by being pressed between a protruding portion (not shown in FIG. 6 but similar to protruding portion 412 in FIG. 4) of housing 602 and a reservoir coupler 610. In some embodiments, base 606 of central member 604 includes a ring 612 and one or more arms 614. Arms 614 may couple ring 612 to central member 604 so that when ring 612 is secured between housing 602 and reservoir coupler 610, central member 604 is fixed to housing 602. In particular embodiments, ring 612 and arms 614 form an opening 616 in base 606 to allow fluid to flow through a flow channel, e.g., flow channel 406 in FIG. 4. Arms 614 may be arranged in any configuration. For instance, arms 614 may be positioned at the equator of ring 612 in a horizontal or vertical direction, or any other angle therebetween. Additionally and alternatively, some embodiments may have more or less than two arms 614.

B. Female Connector Assembly

FIGS. 3-6 illustrate an exemplary male valved connector assembly for coupling with a female valved connector assembly. As will be appreciated herein, components and structures of the exemplary male valved connector are configured to couple with corresponding components and structures of the female valved connector assembly.

Figure 7:
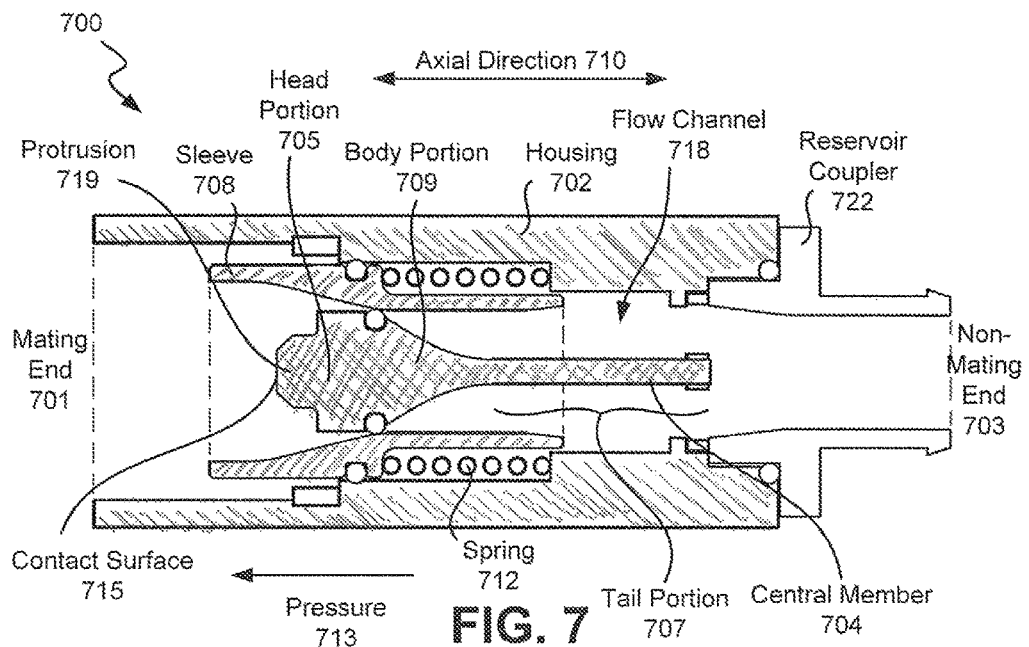
FIG. 7 is a cross-sectional diagram illustrating an exemplary female valved connector assembly having a sleeve in a closed position, according to embodiments of the present disclosure.
Figure 8:
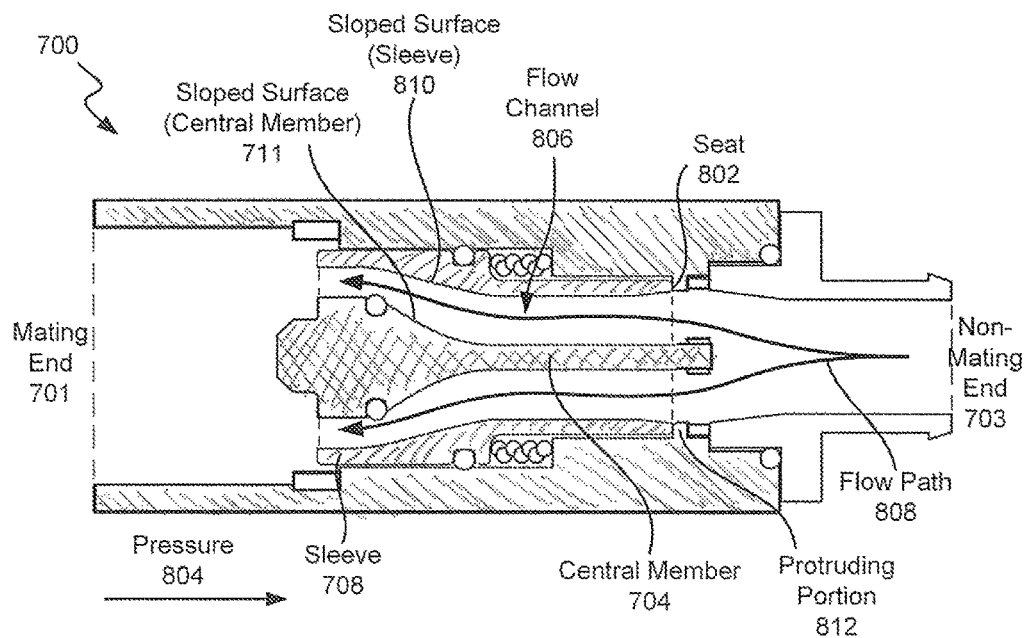
FIG. 8 is a cross-sectional diagram illustrating a perspective view of an exemplary female valved connector assembly having a sleeve in an open position, according to embodiments of the present disclosure.

FIGS. 7 and 8 illustrate an exemplary female valved connector assembly 700 according to embodiments of the present disclosure. Specifically, FIG. 7 is a cross-sectional diagram illustrating female connector assembly 700 whose sleeve is in a closed position, and FIG. 8 is a cross-sectional diagram illustrating female connector assembly 700 whose sleeve is in an open position. Components of female connector assembly 700 that correspond with components of male connector assembly 300 in FIGS. 3-6 are substantially similar and serve substantially similar purposes. Thus, details of those corresponding components can be referenced in the respective discussions in FIGS. 3-6. Discussions of FIGS. 7-8 highlight differences between male and female valved connectors, according to embodiments herein.

As shown in FIG. 7, female connector assembly 700 includes a housing 702 attached to a reservoir coupler 722, a central member 704 disposed within housing 702, and a sleeve 708 positioned between housing 702 and central member 704. Sleeve 708 may be slidably coupled with housing 702 such that sleeve 708 may move in an axial direction 710 relative to central member 704 and housing 702. Sleeve 708 and central member 704 may form a flow channel 718 through which fluid may flow. A spring 712 may be positioned around sleeve 708 outside of flow channel 718, and may be configured to apply pressure 713 against sleeve 708 toward mating end 701 of connector assembly 700.

Similar to male connector assembly 300 in FIG. 3, when pressure applied by spring 712 is overcome by a greater pressure 804 in an opposite direction, e.g., toward non-mating end 703, sleeve 708 may move into the open position, as shown in FIG. 8. In the open position, sleeve 708 may press against a seat 802, which may be a protruding portion 812 of housing 302 that protrudes toward central member 704 to stop further movement of sleeve 708. A sloped surface 711 of central member 704 and a sloped surface 810 of sleeve 708 form a part of a flow channel 806 that extends an entire length between mating end 701 and non-mating end 703. Sloped surfaces 711 and 810 are smooth and continuous such that fluid efficiently flows along a flow path 808 from non-mating end 703 to mating end 701, or vice versa.

Unlike male connector assembly 300, head portion 705 of central member 704 may include a contact surface 715 defining a protrusion 719 instead of a recess 319 shown in FIG. 3. Protrusion 719 may be positioned along the central axis of central member 704, and configured to insert into recess 319 when mated with female connector assembly 700, as will be discussed further herein. In some embodiments, contact surface 715 may not define a protrusion 719, but instead define a flat, vertical surface. Additionally or alternatively, unlike male connector assembly 300, sleeve 708 does not extend past housing 702 along an axial direction 710 toward mating end 701 of connector assembly 700 when sleeve 708 is in the closed position. According to some embodiments, mating end 701 of housing 702 extends past sleeve 708 so that housing 702 may receive another connector assembly, such as male connector assembly 300.

III. Valved Connector System

As discussed herein with respect to FIGS. 3-8, a sleeve of a connector assembly can move between a closed position and an open position. The position of the sleeve may be dependent upon whether a male valved connector assembly and a female valved connector assembly in a valved connector assembly system are connected together. For instance, if the male and female connector assemblies are disconnected from each other, then sleeves of both connector assemblies are in the closed position to prevent fluid from flowing out of respective connector assemblies. Additionally or alternatively, if the male and female connector assemblies are connected together, then sleeves of both connector assemblies are in the open position to allow fluid to flow between both connector assemblies. Details of such connector systems are discussed in detail further herein.

Figure 10B:
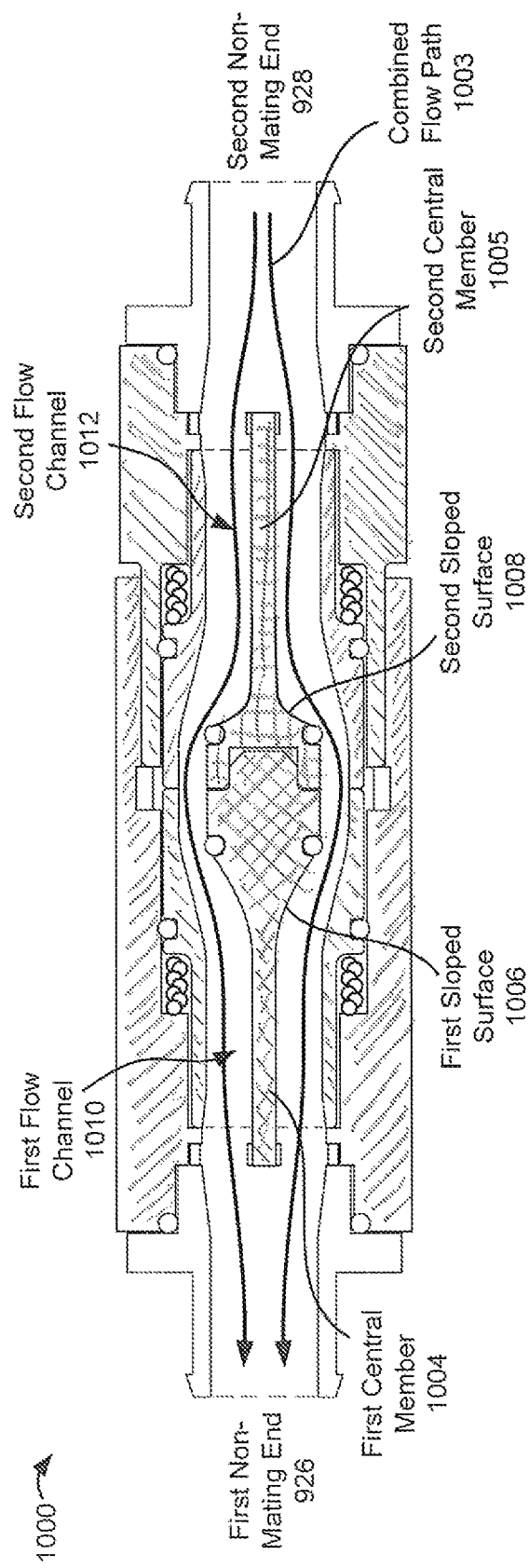
FIG. 10B is a cross-sectional diagram illustrating an asymmetrical valved connector system in a connected state, according to embodiments of the present disclosure.

FIGS. 9, 10A, and 10B illustrate exemplary valved connector systems 900 and 1000 according to embodiments of the present disclosure. FIG. 9 is a cross-sectional diagram illustrating a symmetrical valved connector system 900 in a disconnected state, FIG. 10A is a cross-sectional diagram illustrating symmetrical valved connector system 900 in a connected state, and FIG. 10B is a cross-sectional diagram illustrating an asymmetrical valved connector system 1000 in a connected state.

As shown in FIG. 9, valved connector system 900 includes a first valved connector assembly 902 and a second valved connector assembly 904. First connector assembly 902 may be a female connector assembly, and second connector assembly 904 may be a male connector assembly. Details of first and second connector assemblies 902 and 904 may be referenced in corresponding sections of the detailed description herein with respect to FIGS. 7 and 8, and FIGS. 3-6, respectively. Although FIG. 9 shows first connector assembly 902 as a female connector assembly and second connector assembly 904 as a male connector assembly, embodiments herein are not limited to such configurations. For instance, in other embodiments, first connector assembly 902 may be a male connector assembly and second connector assembly 904 may be a female connector assembly.

When connector system 900 is in the disconnected state, first connector 902 is separated from second connector assembly 904 such that respective first and second sleeves 906 and 908 are in the closed position, where first and second sleeves 906 and 908 contact corresponding first and second central members 910 and 912 to prevent fluid from flowing out of first and second mating ends 922 and 924, respectively. That is, pressure applied by first and second springs 918 and 920 press first and second sleeves 906 and 908 against first and second central members 910 and 912 to seal off first and second flow channels 914 and 916, respectively.

In some embodiments, first connector assembly 902 and second connector assembly 904 are configured to couple with one another, resulting in connector system 900 being in a connected state. For instance, first and second mating ends 922 and 924 of both first connector assembly 902 and second connector assembly 904 may couple with one another so that fluid may flow through connector system 900 between first and second non-mating ends 926 and 928, as shown in FIG. 10A.

Connector system 900 transitions into a connected state by pressing first and second connector assemblies 902 and 904 together. When first connector assembly 902 is pressed against second connector assembly 904, tips of first and second sleeves 906 and 908 contact one another. As pressure is further applied to press first and second connector assemblies 902 and 904 together, pressures applied by first and second springs 918 and 920 are overcome and second housing 932 inserts into first housing 930. As shown in FIG. 10A, at least a portion of second housing 932 inserts into first housing 930 when first and second connector assemblies 902 and 904 couple together. In some embodiments, pressure applied to press first and second connector assemblies 902 and 904 together is greater than the combined pressures applied by first and second springs 918 and 920. Accordingly, first and second springs 918 and 920 collapse under the applied pressure and cause first and second sleeves 906 and 908 to move into the open position. Once in the open position, first and second flow channels 914 and 916 open, and since first and second flow channels 914 and 916 are positioned adjacent to one another, first and second flow channels 914 and 916 form a single, combined flow channel that forms a combined flow path 1002. Combined flow path 1002 extends between first non-mating end 926 and second non-mating end 928 so that fluid can flow across the entire connector system 909.

Once connector system 900 is in the connected state, first and second housings 930 and 932 may be attached to one another by static frictional force, or by any other means, such as by a latch, hook, clip, ball bearing and groove (e.g., a bayonet style locking mechanism), or any other suitable mechanical fastening system. In some embodiments, a protrusion 938 defined by a first contact surface 939 of first central member 910 is positioned within a recess 940 defined by a second contact surface 941 of second central member 912. Protrusion 938 and recess 940 help to align and secure first central member 910 with second central member 912. Although a protrusion is shown as a part of first central member 910, and a recess is shown as a part of second central member 912, embodiments are not so limited. For instance, a protrusion may be a part of second central member 912 and a recess may be a part of first central member 910. In some embodiments, central members 910 and 912 may not have protrusion 938 or recess 940. In these embodiments, central members 910 and 912 may have contact surfaces 939 and 941 which are flat (e.g., vertical from the perspective of FIG. 9) so that no part of first central member 910 inserts into second central member 912. As shown in FIG. 10A, first and second sleeves 906 and 908 stay in the open position to form combined flow path 1002.

According to embodiments of the present disclosure, first and second flow channels are formed by the smooth and continuous surfaces of first and second central members 910 and 912 and first and second sleeves 906 and 908, as discussed herein individually with respect to FIGS. 3-4 and 7-8. The smooth, continuous surfaces combined with the placement of first and second springs 918 and 920, e.g., outside of combined flow path 1002, provides efficient flow between first and second non-mating ends 926 and 928. Although FIG. 10A illustrates combined flow path 1002 as flowing in a direction from second non-mating end 928 to first non-mating end 926 where fluid first flows over second central member 912 and then over first central member 910, one skilled in the art understands that this is not intended to be limiting. Connector systems 900 also enable a combined fluid path to flow in the opposite direction, e.g., from first non-mating end 926 to the second non-mating end 928 where fluid first flows over first central member 910 and then over second central member 912.

As shown in FIG. 10A, first and second sloped surfaces 934 and 936, respectively, are symmetrical, meaning the slope of first sloped surface 934 is a mirror image of second sloped surface 936. In alternative and additional embodiments, an asymmetrical first and second sloped surface may be implemented in connector system 900. The asymmetrical sloped surfaces may optimize fluid flow in one direction. As example, the asymmetrical sloped surfaces may create a tear drop shape where a sloped surface of one central member has a larger slope than the sloped surface of the other central member, as shown in FIG. 10B illustrating asymmetrical valved connector system 1000.

According to certain embodiments, asymmetrical valved connector system 1000 may be substantially similar to symmetrical valved connector system 900, save for a few differences regarding the asymmetrical surfaces of the central members. For instance, valved connector system 1000 includes a first central member 1004 and a second central member 1005. First central member 1004 may have a first sloped surface 1006, and second central member 1005 may have a second sloped surface 1008. As shown in FIG. 10B, second sloped surface 1008 has a larger slope, and/or a more exponential slope, than first sloped surface 1006, thereby forming an asymmetrical, e.g., tear drop, profile. The asymmetrical sloped surfaces create a combined flow path 1003 that flows through second flow channel 1012 and first flow channel 1010 (together forming a single flow channel) in a way that optimizes flow in one direction. As an example, a flow of fluid flowing toward the greater-sloped surface and then passing over the lesser-sloped surface, e.g., from second non-mating end 928 to first non-mating end 926, is optimized by the asymmetrical surfaces of first and second sloped surfaces 1006 and 1008. It is to be appreciated that the asymmetrical profile may be reversed for optimizing fluid flow in the opposite direction, e.g., from first non-mating end 926 to second non-mating end 928.

The efficient flow of fluid results in a low fluid pressure drop between first non-mating end 926 and second non-mating end 928. "Pressure drop" may be defined by the difference in flow pressure between the pressure at first non-mating end 926 and second non-mating end 928, or vice versa depending on the direction of flow. In some embodiments, connector system 900 may have a pressure drop ranging between 0.5 to 1 psi at a flow rate of approximately 45 liters per minute (LPM).

Figure 11:
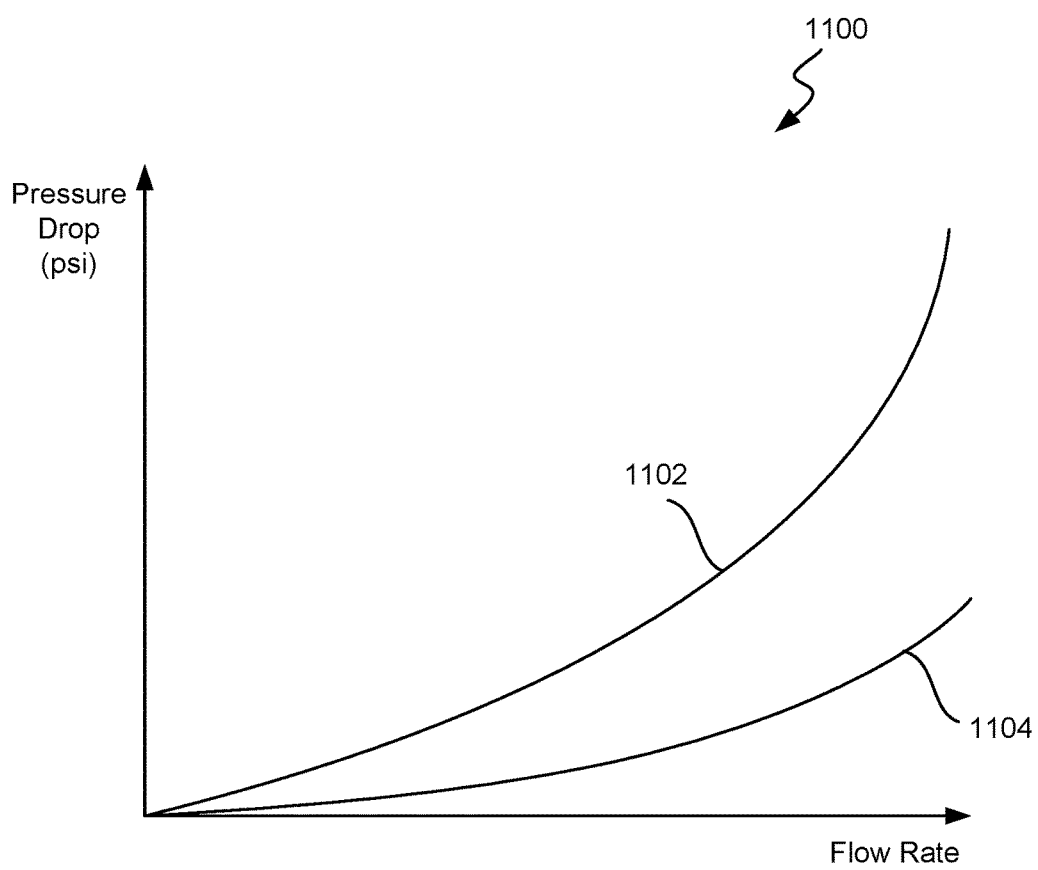
FIG. 11 is a chart showing curves for a conventional connector system and a connector system according to embodiments of the present disclosure.

FIG. 11 is a graph 1100 plotting two separate curves: a first curve 1102 showing the trend of pressure drop across a first connector system that does not have the smooth central members arranged in embodiments discussed herein, and a second curve 1104 showing the trend of pressure drop across a second connector system that does have the smooth central members arranged in embodiments discussed herein. Graph 1100 has a Y-axis representing pressure drop in pounds per square inch (psi) increasing upwards, and an X-axis representing flow rate increasing to the right.

As shown in FIG. 11, both first and second curves 1102 and 1104 may have an exponential curve profile; however, first curve 1102 may have a larger pressure drop as flow rate increases than second curve 1104. For instance, at a flow rate of between 30 to 60 LPM, first connection system (represented by first curve 1102) may have a pressure drop of between 2 to 3 psi, while second connector system, e.g., connector system 900 in FIG. 9, (represented by second curve 1104) may have a pressure drop of between 0.5 and 1 psi. It should be noted that these and other specific numerical values and numeric ranges are provided for illustrative purposes only. Different numerical values may be exhibited in different embodiments and/or different implementations of the system.

A larger pressure drop requires larger pump power to flow fluid through the first connector system. In order to provide larger pump power, a larger pump that needs more electrical operating power is required. Being able to provide high flow rate at lower pressures, as achieved by valved connector systems discussed herein and shown by second curve 1104, avoids these shortcomings. Lower pressure drop means that the fluid pump does not have to provide very high pressure to compensate for pressure losses through the connector system. Because the pump does not have to provide very high pressure, a pump that uses less electrical power can be used in the cooling system.

Although the disclosure has been described with respect to specific embodiments, it will be appreciated that the disclosure is intended to cover all modifications and equivalents within the scope of the following claims.

What is claimed is:

1. A connector system comprising:
   a first connector assembly having a first mating end and a first non-mating end comprising:
   a first housing;
   a first central member disposed within the first housing; and
   a first sleeve disposed between the first central member and the first housing;
   wherein the first sleeve is slidably coupled to the first housing, the first sleeve slidable along an axial direction relative to the first central member; and
   a second connector assembly having a second mating end and a second non-mating end, the second mating end configured to engage the first mating end without a compressible portion being in contact with a surface of either the first mating end or the second mating end, the connector assembly comprising:
   a second housing;
   a second central member disposed within the second housing; and
   a second sleeve disposed between the second central member and the second housing; wherein the second sleeve is slidably coupled to the second housing, the second sleeve slidable along the axial direction;
   wherein the connector system, when in a connected state, comprises the first connector assembly coupled to the second connector assembly, which forms a flow channel defined by at least (1) a first sloped surface on the first sleeve, (2) a first sloped surface on the first central member, (3) a second sloped surface on the second sleeve, and (4) a second sloped surface on the second central member; and
   wherein the connector system, when in a disconnected state, comprises the first connector assembly separated from the second connector assembly, the first and second sleeves close the first and second flow channels, respectively.

2. The connector system of claim 1, wherein the first sloped surface on the first sleeve is part of a conical surface on the first sleeve, the first sloped surface on the first central member is a part of a conical surface on the first central member, the second sloped surface on the second sleeve is part of a conical surface on the second sleeve, and the second sloped surface on the second central member is a part of a conical surface on the second central member.

3. The connector system of claim 2, wherein the conical surface of the first central member has a narrow end toward the first non-mating end of the first connector assembly and a wide end toward the first mating end of the first connector assembly, and wherein the conical surface of the second central member has a narrow end toward the second non-mating end of the second connector assembly and a wide end toward the second mating end of the second connector assembly, such that the mating ends of the first and second connector assemblies are facing one another.

4. The connector system of claim 1, wherein the first sloped surface and the second sloped surface are asymmetrical and form a tear drop shape.

5. A method of connecting a first connector assembly with a second connector assembly comprising:
- orienting a first mating end of the first connector assembly toward a second mating end of the second connector assembly;
- applying a first pressure against the first connector assembly and the second connector assembly toward one another;
- contacting a first sleeve of the first connector assembly with a second sleeve of the second connector assembly, wherein the first pressure is greater than a second pressure applied by a first spring against the first sleeve and a second spring against the second sleeve; and
- coupling a first housing of the first connector assembly with a second housing of the second connector assembly by engaging the first mating end and the second mating end without a compressible portion being in contact with a surface of either the first mating end or the second mating end to form a flow channel that extends across the entire connector system.

6. The method of claim 5, wherein coupling the first housing with the second housing is performed by further applying the first pressure against the first connector assembly and the second connector assembly to insert the second connector assembly into the first connector assembly.

7. The method of claim 5, wherein coupling the first housing with the second housing moves the first sleeve and the second sleeve from a closed position to an open position.

8. The method of claim 7, wherein, in the closed position, the first sleeve contacts a first central member of the first connector assembly, and the second sleeve contacts a second central member of the second connector assembly.

9. The method of claim 7, wherein, in the open position, the first sleeve is separated from a first central member, and the second sleeve is separated from a second central member.

10. The method of claim 9, wherein the flow channel surrounds the first central member and the second central member.

* * * * *